United States Patent
Clough et al.

(10) Patent No.: US 6,670,982 B2
(45) Date of Patent: Dec. 30, 2003

(54) WIRELESS DIGITAL CAMERA MEDIA

(75) Inventors: James Clough, Boise, ID (US); Darrel D. Cherry, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/039,108

(22) Filed: Jan. 4, 2002

(65) Prior Publication Data

US 2003/0128272 A1 Jul. 10, 2003

(51) Int. Cl.[7] .................................................. H04N 7/14
(52) U.S. Cl. ................ 348/14.02; 348/14.01; 348/220.01
(58) Field of Search ........................... 348/14.01–14.09, 348/14.1, 14.12, 14.13, 220.01; 455/556, 557, 558; H04N 7/14

(56) References Cited

U.S. PATENT DOCUMENTS 6,397,388 B1 * 5/2002 Allen ........................ 725/133

FOREIGN PATENT DOCUMENTS

| JP | 407203013 A | * | 8/1995 | ............ H04M/1/65 |
| JP | 11-261717 | * | 9/1999 | .......... H04M/11/00 |
| JP | 11-308588 | * | 11/1999 | ............ H04N/7/14 |

* cited by examiner

*Primary Examiner*—Melur Ramakrishnaiah

(57) ABSTRACT

Improved methods and apparatuses are provided for use with digital cameras. A wireless digital media card is provided for use in a digital camera. The wireless digital media card is configured to replace a conventional digital media card and includes an interface to the digital camera, a transceiver configured to transmit image data over a wireless communication link and logic configured to receive image data from the digital camera via the interface and provide the image data to the transceiver for transmission. The wireless digital media card may also include memory configured to store the image data. A receiving device is configured to store and/or further transfer the image data as needed.

17 Claims, 3 Drawing Sheets

WIRELESS DIGITAL CAMERA MEDIA

TECHNICAL FIELD

The present invention relates generally to digital cameras, and more particularly to methods and apparatuses for downloading image data files from a digital camera to one or more other devices using a wireless digital camera media.

BACKGROUND

A typical conventional digital camera is configured to capture image data through a lens using a charge-coupled device (CCD). The lens focuses the light reflected/emitted from the image onto the CCD, which is configured to record digital image data to a digital image data file. The digital image data file is usually stored in a non-volatile memory provided within a "digital camera media". For example, certain digital camera media take the form a compact flash memory card or the like, which is removable from the digital camera. In this manner, one or more image data files can be stored in the digital camera media. The image data files can be formatted, for example, as a tagged image file format (TIFF) data file, a Joint Photographic Experts Group (JPEG) data file, etc.

To subsequently view and/or otherwise access the information stored on the digital camera media, for example, using a personal computer (PC), the digital camera (with the digital camera media installed therein) can be connected using a wire connecter to the PC. For example, many digital cameras have a universal serial bus (USB) connector that can be coupled to a similar connector on the PC through a USB cable. Once connected to the PC, the image data file(s) can be accessed and/or downloaded to the PC for further processing. An alternative approach is to remove the digital camera media from the digital camera and connect it to a digital camera media reader that is connected to the PC. In this configuration, the digital camera is not required.

Consider now, for example, that a professional photographer is using a digital camera to take photos during a photo shoot. Here, the photographer will likely be taking several photos and will quickly fill memory in the digital camera media with image data files. As a result, the photographer will need to periodically change the digital camera media. For example, the photographer can replace the digital camera media with a new digital camera media. This may take less than a minute to accomplish the swap. Unfortunately, digital camera media can be expensive. Hence, the professional photographer may require a prohibitive number of digital camera media for a lengthy photo shoot.

One option is to somehow transfer (i.e., download) the stored image data files to a PC. Thus, the photographer could halt the photo shoot and download the image data files from the digital camera to the PC. If there is only one digital camera, then this may prove unacceptable since it would interrupt the photo shoot. Alternatively, the photographer or an assistant could download image data files from a recently used digital camera media using a digital camera media reader. This could allow the photographer to continue the photo shoot with another digital camera media installed in the digital camera. While this is an improvement, there are added costs associated with it.

Moreover, in either of the suggested solutions, there is an inherent latency between the image capture and the time at which the image can be reviewed or otherwise processed by the PC. For example, if the photographer or another person would like to review the photos being taken, then they are required to wait until the image data files are downloaded to the PC.

One possible solution to such problems is to keep the digital camera connected to the PC via a cable. If this were possible, then image data files can be accessed sooner. One drawback to this, however, is the photographer may be unwilling to work with a digital camera that requires a cable. Furthermore, the cable solution may prove unworkable when the photo shoot is located in a remote location.

Another example of a digital camera user that may be troubled by such conventional image data file download procedures, is a real estate agent or associate tasked with taking pictures of properties for sale. Here, for example, the image data files may need to be downloaded from the digital camera to a PC and then uploaded to an Internet web server. Once again, it would be beneficial if the burden and/or latency required to download the image data files could be reduced.

Thus, for these reasons and others, there is a need for improved methods and apparatuses for downloading image data files from a digital camera to one or more other devices.

SUMMARY

In accordance with certain aspects of the present invention, improved methods and apparatuses are provided for downloading image data files from a digital camera to one or more other devices over a wireless connection.

Thus, for example, in accordance with certain implementations of the present invention, a wireless digital media card is provided for use in a digital camera. The wireless digital media card is configured to replace a conventional digital media card and includes an interface to the digital camera, a transceiver configured to transmit image data over a wireless communication link and logic configured to receive image data from the digital camera via the interface and provide the image data to the transceiver for transmission. The wireless digital media card may also include memory configured to store the image data.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
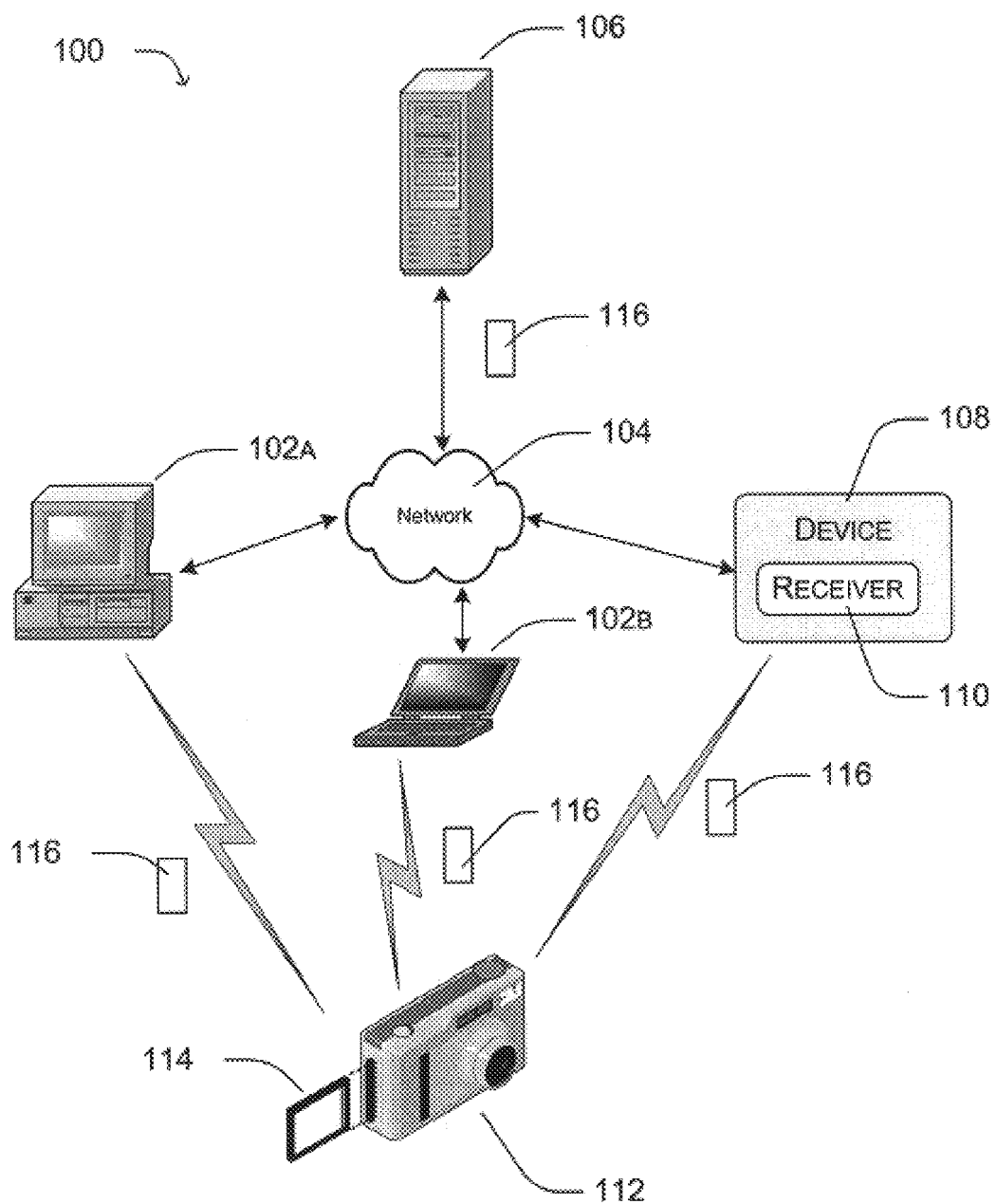
FIG. 1 is a block diagram depicting a networked environment having a plurality of different devices configured to connect over a wireless link to a digital camera having a wireless digital camera media card therein, in accordance with certain exemplary implementations of the present invention.

FIG. 1 is a block diagram depicting a networked environment 100 having a plurality of different devices configured to connect over a wireless link to a digital camera having a wireless digital camera media card therein, in accordance with certain exemplary implementations of the present invention.

In this example, a desktop PC 102A and a laptop PC 102B are shown as being connected to a network 104. A server 106 is also depicted as being connected to network 104. PC's 102A–B and server 106 are just a few representative devices that can be interconnected within environment 100.

A generic appliance or other device 108 is also depicted as being connected to network 104. Device 108, for example, may include a wireless hub or relay device, a computing device, a server device, an image processing device, a printing device, a base station, a mobile communication device, a personal digital assistant (PDA) device, and other like devices.

PC's 102A–B and device 108 are further depicted as being operatively coupled to a digital camera 112 via a wireless communication link. By way of example, device 108 is shown as having a receiver 110 that is configured to communicate over a wireless link to digital camera 112. Similar communication circuits can also be provided within or otherwise operatively coupled to PC's 102A–B. Although not illustrated in FIG. 1, it should be understood that server 106 may also be configured to connect to digital camera 112 over a wireless communication link.

As illustratively depicted in FIG. 1, digital camera 112 includes a wireless digital media card 114. Here, for example, wireless digital media card 114 is removable and when inserted into digital camera 112, wireless digital media card 114 will essentially be enclosed within the body of digital camera 112.

In accordance with certain preferred implementations of the present invention, wireless digital media card 114 is operatively configured to replace a conventional digital media card. In such cases, wireless digital media card 114 has approximately the same physical size as the conventional digital media card it is replacing. Further, wireless digital media card 114 is operatively configured to provide the same physical and functional interface that the digital camera would expect of the conventional digital media card.

As will be described, the amount of image data file storage provided by wireless digital media card 114 might be smaller than a conventional digital media card. Moreover, the ability of the user to subsequently review stored image data files using digital camera 112 may be limited since one or more of the stored image data files may no longer be stored within wireless digital media card 114 having already been sent over the wireless communication link to an external device, such as, e.g., PC's 102A–B, and/or device 108.

In FIG. 1, an image data file 116 is illustratively shown as being transferred over the various wireless communication links. An image data file is also depicted as being provided to (or accessed from) server 106.

Those skilled in the art will now recognize that the various devices in environment 100 may transfer an image data file 116 in a variety of ways. By way of example, in accordance with certain implementations, an image data file 116 is sent from digital camera 112 over a wireless communication link to device 108, which is configured to forward image data file 116 to PC 102A through network 104. In another exemplary arrangement, device 108 forwards the received image data file 116 to server 106, again through network 104. In yet another example, device 108 forwards the received image data file 116 to two or more devices connected through network 104.

Network 104, for example, may include any type of communication system(s), such as, e.g., the Internet, an intranet, a wide area network (WAN), a local area network (LAN), a wireless network, a telephone network, a satellite network, a terrestrial wireless network, a dedicated communication channel/line/link, etc.

One of the benefits to the resulting "wireless digital camera" is that images can be captured and automatically and/or selectively transferred to another device. Hence, with respect to the exemplary users described in the Background section, a ready solution exists to reduce their burden. For example, a professional photographer would not need to stop the photo shoot to swap digital media cards or otherwise physically connect the digital camera to another device in order to transfer the stored image data files. Instead, wireless digital media card 114 can be configured to automatically transferred image data files to an external device such as PCs 102A–B, device 108 and/or server 106.

For a realtor driving around the region shooting photos of various properties for sale, wireless digital media card 114 can be configured to automatically and/or selectively transfer the image data files to one or more external devices. For example, in accordance with certain implementations, wireless digital media card 114 would transfer the image data files to laptop PC 102B, which would subsequently transfer the image data files through another wireless communication link (within network 104) to the Internet and onto a web server. In accordance with still other implementations, wireless digital media card 114 may be configured to access a mobile communications network, such as, e.g., a cellular or PCS network, and transfer the image data files to device 108 through the resulting wireless communication link. Here, device 108 could be a base station, for example, that is further configured to forward the image data files to server 106 through network 104.

As can be seen from these examples, there are a wide variety of operative communication paths through which image data files may be passed. The initial path from wireless digital media card 114 is, however, wireless. Consequently, the configuration/type of transceivers provided within wireless digital media card 114 and the first receiving device will define this initial path.

Figure 2:
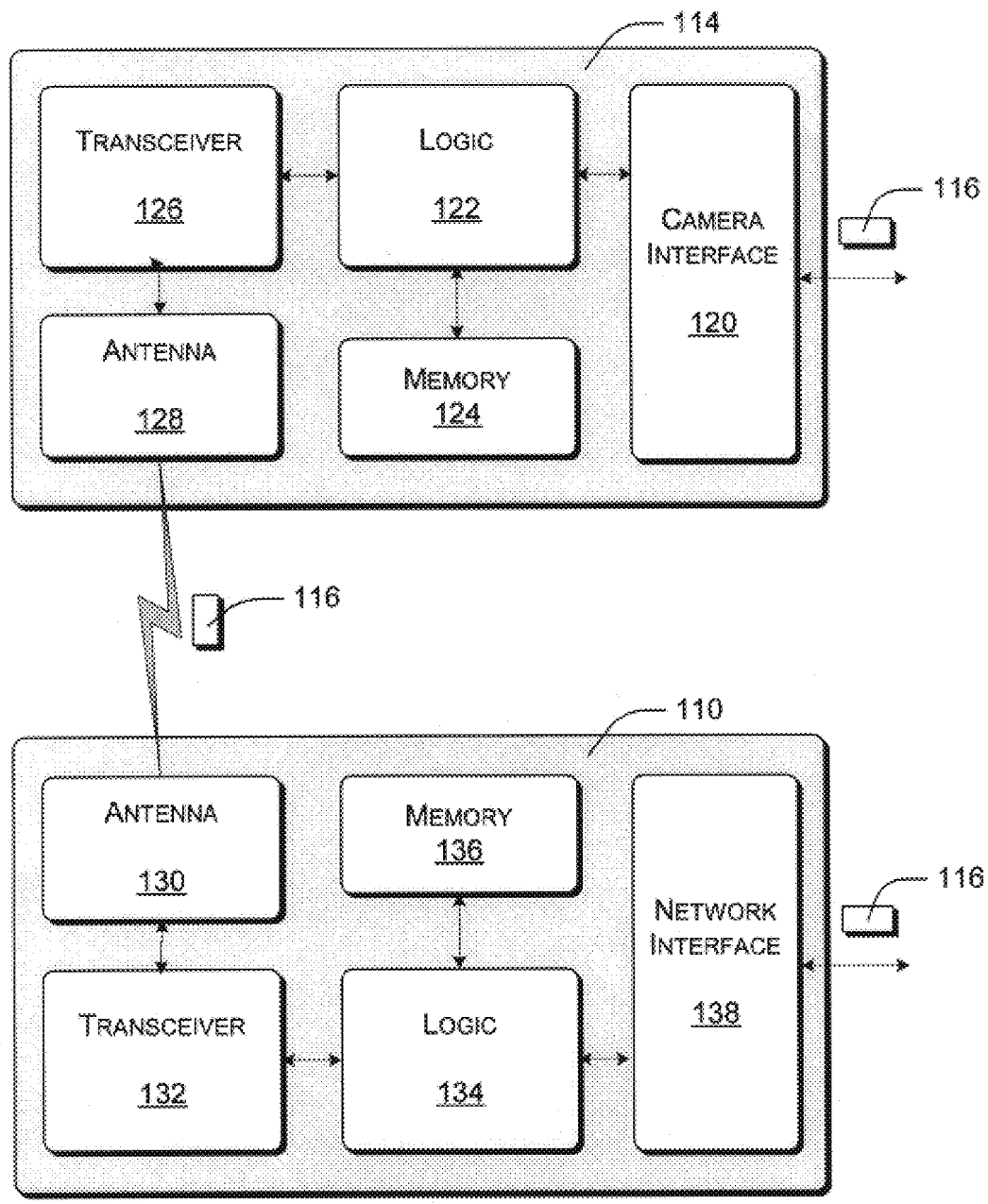
FIG. 2 is a block diagram depicting selected portions of a device configured to connect over a wireless link and selected portions of a wireless digital camera media card, for example, as in FIG. 1, in accordance with certain exemplary implementations of the present invention.

With this in mind, FIG. 2 depicts selected portions of device 108 (namely, receiver 110) and wireless digital media card 114, in accordance with certain exemplary implementations of the present invention.

Wireless digital media card 114 includes a camera interface 120, logic 122, memory 124, a transceiver 126, and an antenna 128. Camera interface 120 is configured to provide the applicable physical and electrical connectivity to digital camera 112. Camera interface 120 will vary depending upon the digital camera, since different manufacturers have defined their own particular interface features (some of which are currently proprietary). Those skilled in the art will nevertheless recognize that wireless digital media card 114 is essentially a modified digital media card and as such camera interface 120 would be a known design element.

As shown, in this example, camera interface 120 is coupled to logic 122. Logic 122 is configured to control the transferring of image data files from camera interface 120 to memory 124, and from memory 124 to transceiver 126. Consequently, in certain implementations, logic 122 may support some of the known design elements associated with camera interface 120 and memory 124. Logic 122 will also provide the new functionality associated with the wireless operations.

Thus, for example, logic 122 can be configured to cause transceiver 126 to initiate a wireless communication session with external device 108. Logic 122 can be configured to monitor the image data file storage process and automatically and/or selectively cause at least a portion of one or more image data files to be transferred to device 108 (i.e., receiver 110). For example, logic 122 may be configured to automatically transfer each image data file once it is stored in memory 124. Logic 122 may be configured to monitor the status of the wireless communication link and transfer all or part of one or more image data files when the status indicates that the transfer should be successful.

In still other exemplary implementations, logic 122 may be configured to monitor the status of memory 124 and transfer image data files once image data files occupy a threshold amount of memory. For example, depending upon the amount of memory 124, the threshold may be set to about 50% in certain implementations.

In these and other implementations, for example, a burst of image data can be transmitted over the wireless communication link at certain selected instances.

Memory 124 is preferably non-volatile and configurable as would be the memory in a conventional digital media card. The amount of memory could vary depending upon the desired configuration, size constraints, energy constraints, and/or cost constraints, for example. Thus, the amount of memory 124 could be less than, equal to, or greater than the amount of memory found in conventional digital media cards. Currently, conventional digital media cards range anywhere from about 4 Mbytes to about 256 Mbytes, however the amount is expected to increase as time moves forward.

In certain implementations, memory 124 may be configured to provide minimal temporary buffering of image data that is transferred without significant delay from camera interface 120 through logic 122/memory 124 to transceiver 126 for transmission over the wireless communication link. Indeed, in certain implementations, there may be no need for memory 124. For example, if digital camera provides enough buffering to hold the image data while it is being transferred to camera interface 120, and logic 122, transceiver 126 and the wireless communication link (and receiver 110) are fast enough to transfer the image data, then memory 124 may not be required.

Transceiver 126 is configured to establish and maintain the wireless communication link and transfer image data over the wireless communication link. Transceiver 126 achieves such tasks by being configured in accord with a communication standard/protocol. In accordance with certain exemplary implementations, transceiver 126 is configured in accord with an IEEE 802.11b wireless networking standards. IEEE 802.11 specifies an over-the-air interface between a wireless client and a base station or between two wireless clients. IEEE 802.11b is an extension to IEEE 802.11 that applies to wireless LANs and provides 11 Mbps transmission (with a fallback to 5.5, 2 and 1 Mbps) in the 2.4 GHz band.

Those skilled in the art will recognize that other wireless technologies can be implemented or otherwise supported. For example, as previously mentioned, transceiver 126 may be configured according to mobile communication standards such as those employed in the cellular telephone, PCS, and other like communication systems. Technologies such as Bluetooth may also be supported.

Transceiver 126 is coupled to an antenna 128, which is configured to transmit image data files 116 over a wireless communication link to a corresponding antenna 130 in receiver 110 (within device 108).

In this exemplary implementation, antenna 130 is coupled to a transceiver 132. Transceiver 132 is configured to establish and maintain the wireless communication link over which the image data is transferred. Transceiver 132 is coupled to logic 134, which is configured to further store, as needed, all or part of the received image data files in memory 136. Here, memory 136 can include volatile and/or non-volatile memory.

In this example, logic 134 is further configured to transfer the received/stored image data files to network 104, via network interface 138, for further delivery to one or more other devices coupled to network 104. Network interface 138 can take on a variety of known configurations, the most common being an Ethernet interface, and a modem interface. In this manner, device 108 is able to provide the additional connectivity required to complete the transfer of image data file 116.

Figure 3:
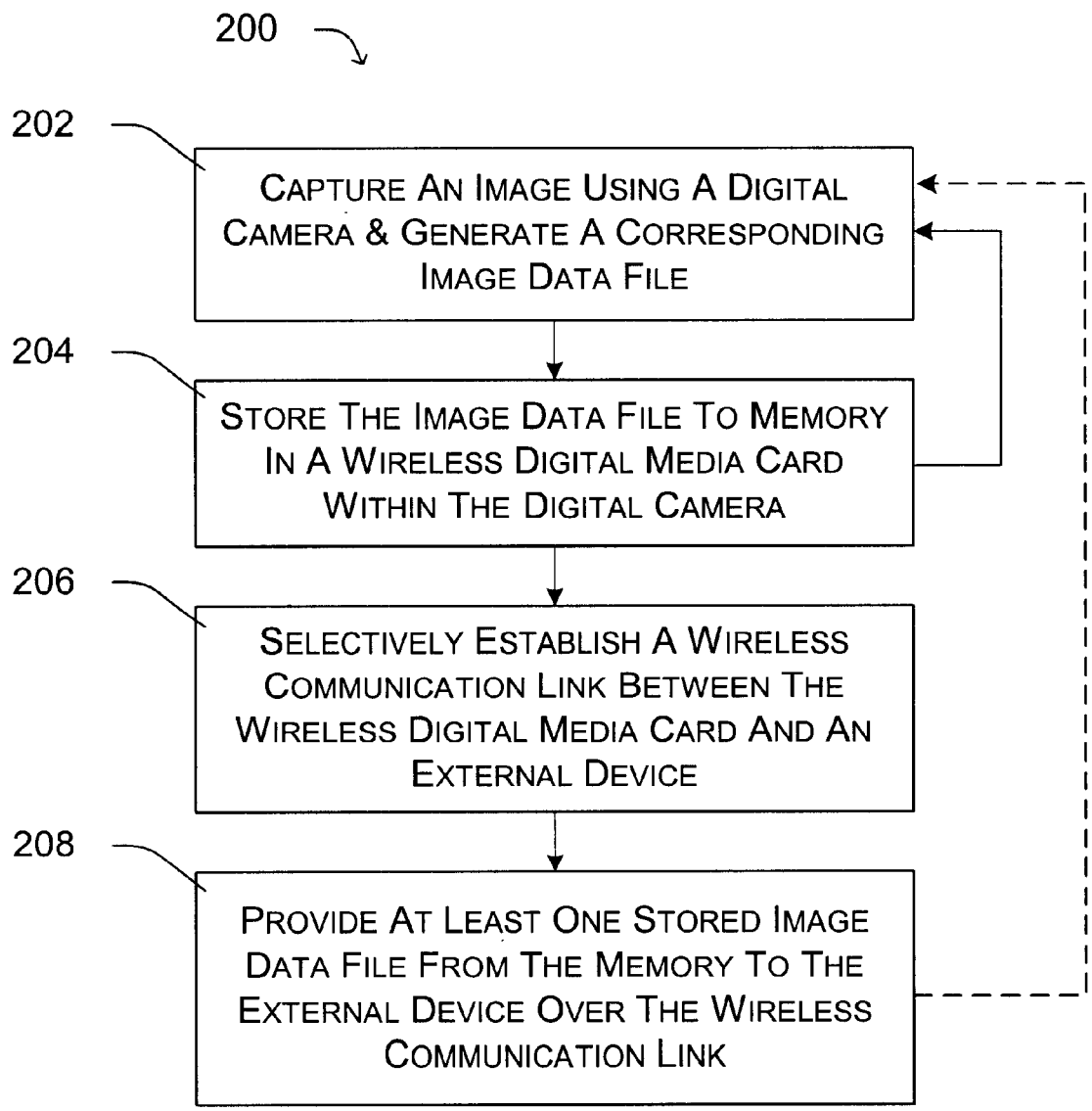
FIG. 3 is a flow diagram depicting a method for use in a digital camera having a wireless digital media card, such as, for example, as in FIG. 2, in accordance with certain exemplary implementations of the present invention.

FIG. 3 depicts a flow diagram depicting a process 200 for use in a digital camera 112 having a wireless digital media card 114, in accordance with certain exemplary implementations of the present invention.

In step 202, an image data file is generated by digital camera 112 for a captured image. In step 204, the image data file is stored to memory within wireless digital media card 114. Here, process 200 may return to step 202 wherein another image is captured by digital camera 112, and/or continue to step 206 wherein a wireless communication link is established between wireless digital media card 114 and device 108, for example. Note, in certain implementations, step 206 may occur prior to (or concurrently with) steps 202/204, for example, during power-on/initialization of digital camera 112. In step 208, the image data file (or a portion thereof) is copied/transferred to device 108, for example, from memory 124. Here, process 200 returns to step 202, as needed, for example.

Although some preferred implementations of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A wireless digital media card for use within a digital camera, the wireless digital media card comprising:
   a removable circuit card configured to fit within a digital camera, the circuit card having:
      an interface configurable to operatively couple to the digital camera;
      a transceiver configurable to transmit image data over a wireless communication link; and
      logic operatively coupled to the interface and the transceiver, and configured to receive image data from the digital camera via the interface and provide the image data to the transceiver for transmission.

2. The wireless digital media card as recited in claim 1, wherein the removable circuit card further includes:
   memory operatively coupled to the logic and configurable to store image data, and
   wherein the logic is further configured to selectively store image data in the memory and selectively retrieve image data from the memory.

3. The wireless digital media card as recited in claim 1, wherein the removable circuit card further includes:
   an antenna operatively coupled to the transceiver.

4. The wireless digital media card as recited in claim 1, wherein the transceiver is configured to provide data communications in accord with IEEE 802.11 standards.

5. The wireless digital media card as recited in claim 1, wherein the logic is configured to cause image data to be transmitted by the transceiver based on a status of the wireless communication link.

6. The wireless digital media card as recited in claim 2, wherein the logic is configured to cause image data to be transmitted by the transceiver based on an amount of image data stored within the memory.

7. The wireless digital media card as recited in claim 6, wherein the logic is configured to cause image data to be transmitted by the transceiver when at least one complete image data file is stored in within the memory.

8. A system comprising:
   at least one device having a receiver configured to receive image data transmitted over a wireless communication link; and
   a digital camera configured to generate the image data, and having operatively configured therein a removable wireless digital media card that includes an interface operatively coupled to the digital camera, a transceiver configured to transmit the image data over the wireless communication link, and logic operatively coupled to the interface and the transceiver, and configured to receive the image data from the digital camera via the interface and provide the image data to the transceiver for transmission.

9. The system as recited in claim 8, wherein the removable wireless digital media card further includes memory operatively coupled to the logic and configured to store image data, and wherein the logic is further configured to selectively store image data in the memory and selectively retrieve image data from the memory.

10. The system as recited in claim 8, wherein the removable wireless digital media card further includes an antenna operatively coupled to the transceiver.

11. The system as recited in claim 8, wherein the device is selected from a group of devices comprising a wireless hub, a relay device, a computing device, a sewer device, an image processing device, a printing device, a base station, a mobile communication device, and a personal digital assistant (PDA) device.

12. A method for use in a digital camera, the method comprising:
   capturing an image using a digital camera;
   generating image data corresponding to the captured image;
   establishing a wireless communication link between a removable wireless digital media card that is operatively configured within the digital camera and an external device; and
   transferring the image data to the external device over the wireless communication link using the removable wireless digital media card.

13. The method as recited in claim 12, further comprising storing the image data in the removable wireless digital media card within the digital camera.

14. The method as recited in claim 12, wherein transferring the image data to the external device over the wireless communication link using the removable wireless digital media card further includes transmitting the image data in accord with IEEE 802.11 standards.

15. The method as recited in claim 12, wherein transferring the image data to the external device over the wireless communication link using the removable wireless digital media card further includes selectively transmitting the image data based on a status of the wireless communication link.

16. The method as recited in claim 13, wherein transferring the image data to the external device over the wireless communication link using the removable wireless digital media card further includes selectively transmitting the image data based on an amount of image data stored within the removable wireless digital media card.

17. The method as recited in claim 16, wherein selectively transmitting the image data based on the amount of image data stored within the memory further includes causing the image data to be transmitted when at least one complete image data file is stored in within the removable wireless digital media card.

* * * * *